(12) United States Patent
Kim et al.

(10) Patent No.: US 11,549,167 B2
(45) Date of Patent: Jan. 10, 2023

(54) STEEL SHEET PLATED WITH AL—FE ALLOY FOR HOT PRESS FORMING HAVING EXCELLENT CORROSION RESISTANCE AND HEAT RESISTANCE, HOT PRESS FORMED PART, AND MANUFACTURING METHOD THEREFOR

(71) Applicant: POSCO, Pohang-si (KR)

(72) Inventors: Seong-Woo Kim, Gwangyang-si (KR); Jin-Keun Oh, Gwangyang-si (KR); Sang-Heon Kim, Gwangyang-si (KR); Yeol-Rae Cho, Pohang-si (KR)

(73) Assignee: POSCO, Pohang-si (KR)

( * ) Notice: Subject to any disclaimer, the term of this patent is extended or adjusted under 35 U.S.C. 154(b) by 0 days.

(21) Appl. No.: 17/297,743

(22) PCT Filed: Nov. 29, 2019

(86) PCT No.: PCT/KR2019/016761
§ 371 (c)(1),
(2) Date: May 27, 2021

(87) PCT Pub. No.: WO2020/111879
PCT Pub. Date: Jun. 4, 2020

(65) Prior Publication Data
US 2022/0049337 A1    Feb. 17, 2022

(30) Foreign Application Priority Data

Nov. 30, 2018    (KR) .................. 10-2018-0152574
Nov. 29, 2019    (KR) .................. 10-2019-0156856

(51) Int. Cl.
*C23C 2/12*    (2006.01)
*B32B 15/01*    (2006.01)
(Continued)

(52) U.S. Cl.
CPC .............. *C23C 2/12* (2013.01); *B32B 15/012* (2013.01); *C21D 9/48* (2013.01); *C22C 21/02* (2013.01);
(Continued)

(58) Field of Classification Search
CPC ..... C22C 38/001; C22C 38/002; C22C 38/02; C22C 38/04; C22C 38/06; B32B 15/012
(Continued)

(56) References Cited

U.S. PATENT DOCUMENTS 6,296,805 B1    10/2001    Laurent et al.
10,590,522 B2    3/2020    Oh et al.
(Continued)

FOREIGN PATENT DOCUMENTS

CN    106133179 A    11/2016
CN    107614733 A    1/2018
(Continued)

OTHER PUBLICATIONS

International Search Report dated Mar. 23, 2020 issued in International Patent Application No. PCT/KR2019/016761 (with English translation).
(Continued)

*Primary Examiner* — Humera N. Sheikh
*Assistant Examiner* — Katherine A Christy
(74) *Attorney, Agent, or Firm* — Morgan, Lewis & Bockius LLP

(57) ABSTRACT

A steel plate plated with an aluminum-iron alloy for hot press forming can include a base steel sheet and an alloy plated layer formed on the base steel sheet. The alloy plated layer can include an alloyed layer (I) formed on the base steel sheet and containing, by weight, Al: 5-30%; an alloyed layer (II) formed on the alloyed layer (I) and containing, by weight, Al: 30-60%; and an alloyed layer (III) formed on the
(Continued)

alloyed layer (II) and containing, by weight, Al: 20-50%. The alloy layer (II) can have a FeAl (Si) alloy phase dispersed and distributed therein, in which the FeAl (Si) alloy phase includes, by weight, Al: 20-50% and Si: 5-20%, and the number density of the FeAl (Si) alloy phase having a circle-equivalent diameter of 5 μm or less 15 is 103/mm2 or more.

5 Claims, 3 Drawing Sheets

(51) Int. Cl.
    *C22C 38/00*     (2006.01)
    *C22C 38/02*     (2006.01)
    *C22C 38/04*     (2006.01)
    *C22C 38/06*     (2006.01)
    *C21D 9/48*     (2006.01)
    *C22C 21/02*     (2006.01)

(52) U.S. Cl.
    CPC .......... *C22C 38/001* (2013.01); *C22C 38/002* (2013.01); *C22C 38/02* (2013.01); *C22C 38/04* (2013.01); *C22C 38/06* (2013.01)

(58) Field of Classification Search
    USPC ......................................................... 428/653
    See application file for complete search history.

(56) References Cited

U.S. PATENT DOCUMENTS

| | | | |
|---|---|---|---|
| 10,640,840 | B2 | 5/2020 | Kim et al. |
| 2002/0018909 | A1 | 2/2002 | Mareuse et al. |
| 2014/0120366 | A1 | 5/2014 | Sohn |
| 2016/0376679 | A1* | 12/2016 | Kim ................ C23C 2/02 428/653 |
| 2017/0029955 | A1 | 2/2017 | Kim et al. |
| 2018/0142337 | A1 | 5/2018 | Kim |
| 2018/0223387 | A1 | 8/2018 | Sohn et al. |
| 2019/0003029 | A1* | 1/2019 | Oh ................ C22C 38/04 |
| 2019/0366686 | A1 | 12/2019 | Fuda et al. |
| 2020/0017948 | A1 | 1/2020 | Van Schoonevelt et al. |
| 2020/0086608 | A1 | 3/2020 | Oh et al. |
| 2020/0109464 | A1 | 4/2020 | Kim et al. |
| 2020/0165712 | A1 | 5/2020 | Beentjes et al. |
| 2020/0385836 | A1 | 12/2020 | Yi et al. |

FOREIGN PATENT DOCUMENTS

| | | |
|---|---|---|
| CN | 108474096 A | 8/2018 |
| CN | 108588612 A | 9/2018 |
| JP | S51-030017 B1 | 8/1976 |
| JP | 2002-194519 A | 7/2002 |
| JP | 2004-244704 A | 9/2004 |
| JP | 2005-256108 A | 9/2005 |
| JP | 2005-264188 A | 9/2005 |
| JP | 2006-274330 A | 10/2006 |
| JP | 2010-018860 A | 1/2010 |
| JP | 2012-112010 A | 6/2012 |
| JP | 5476676 B2 | 4/2014 |
| JP | 2017-532451 A | 11/2017 |
| JP | 2017-535666 A | 11/2017 |
| JP | 2020-509200 A | 3/2020 |
| JP | 2020-510755 A | 4/2020 |
| JP | 2020-510756 A | 4/2020 |
| JP | 2020-521880 A | 7/2020 |
| KR | 10-1569505 B1 | 11/2015 |
| KR | 10-1696121 B1 | 1/2017 |
| KR | 10-2018-0074292 A | 7/2018 |
| KR | 10-1879104 B1 | 7/2018 |
| WO | 2010/005121 A1 | 1/2010 |
| WO | 2016/104880 A1 | 6/2016 |
| WO | 2017/111525 A1 | 6/2017 |
| WO | 2018/123831 A1 | 7/2018 |
| WO | 2018/142534 A1 | 8/2018 |

OTHER PUBLICATIONS

Indian Office Action dated Feb. 28, 2022 issued in Indian Patent Application No. 202117029122 (with English translation).
Japanese Office Action dated Jul. 26, 2022 issued in Japanese Patent Application No. 2021-529447.
Chinese Office Action dated Nov. 3, 2022 issued in Chinese Patent Application No. 201980078996.9.

* cited by examiner

【FIG. 1】
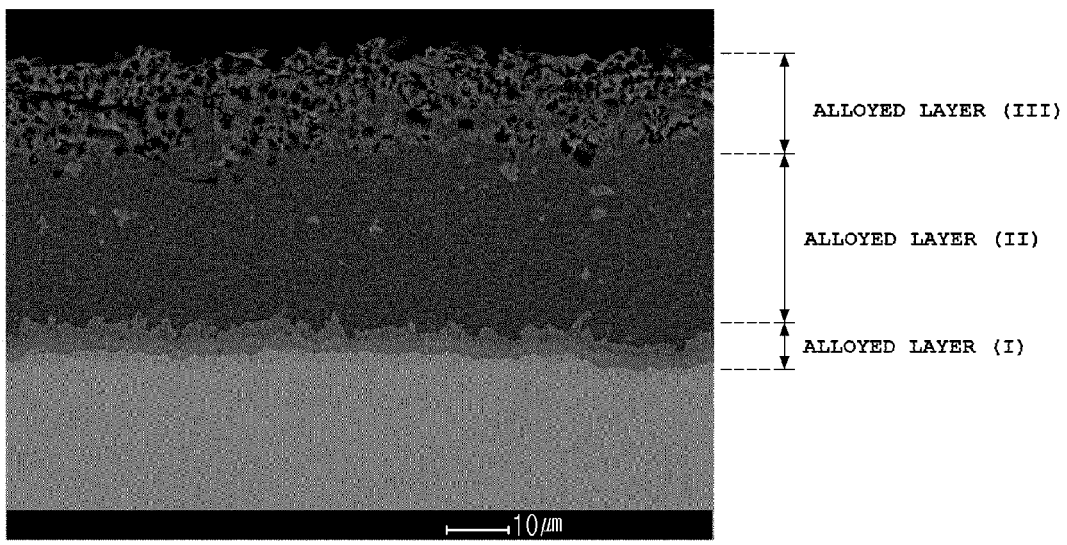
【FIG. 2】
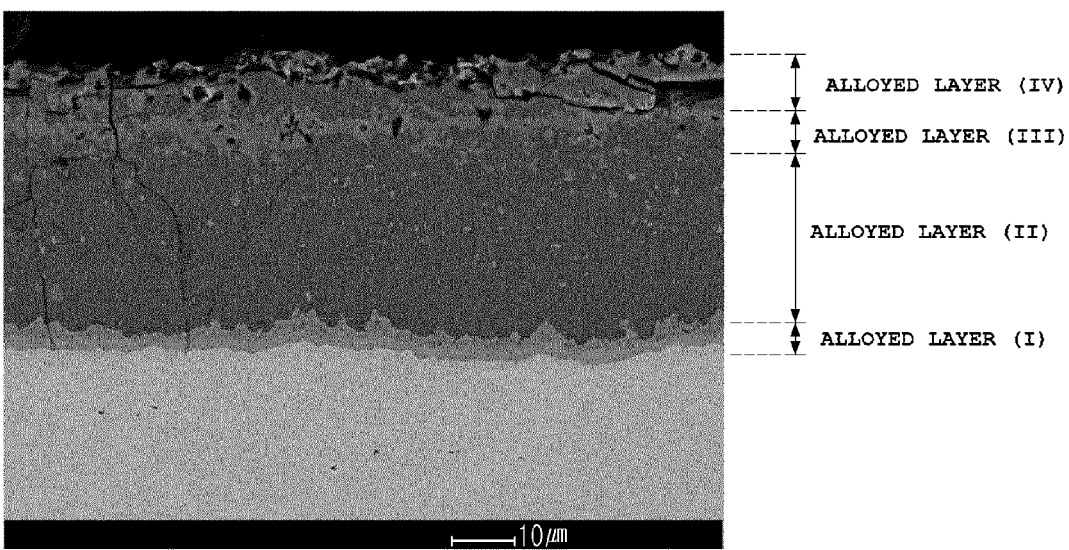

【FIG. 3】
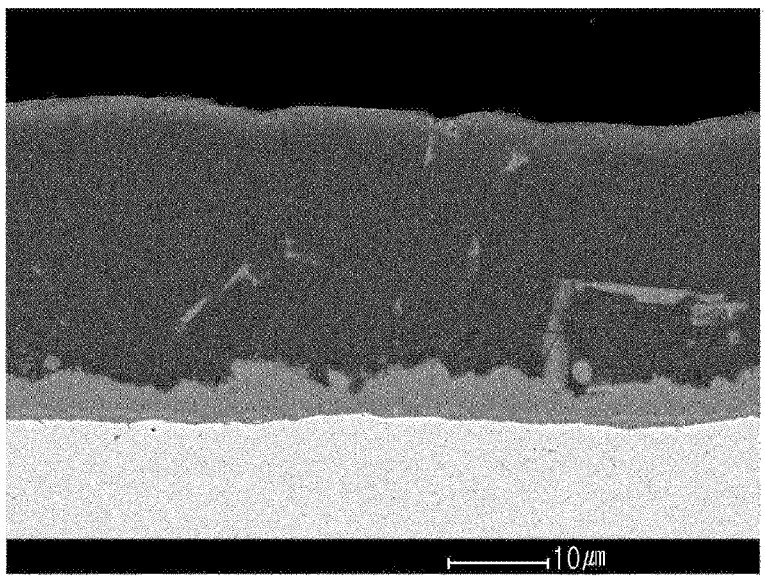
【FIG. 4】
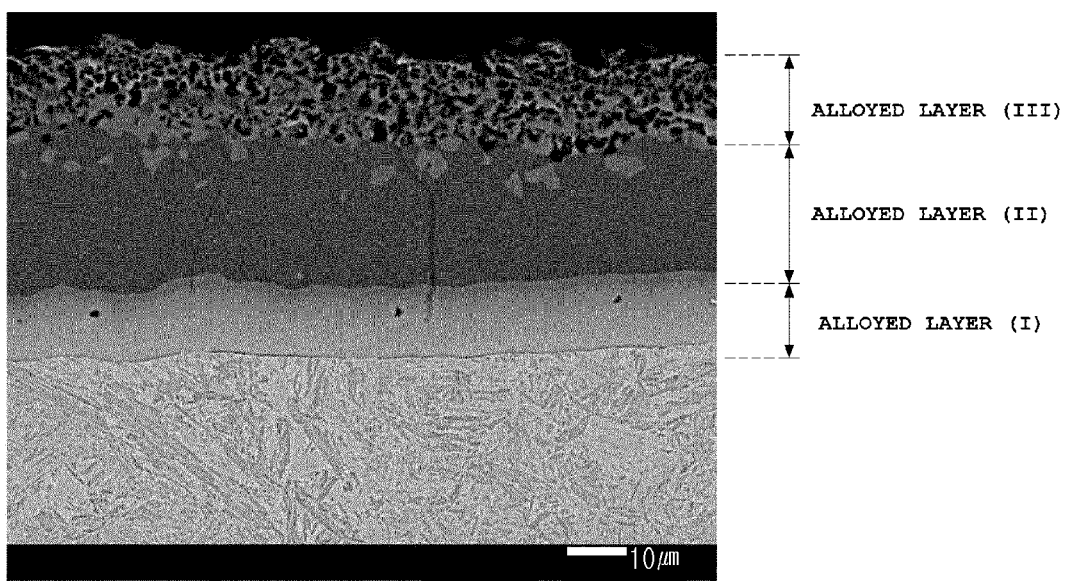

[FIG. 5]
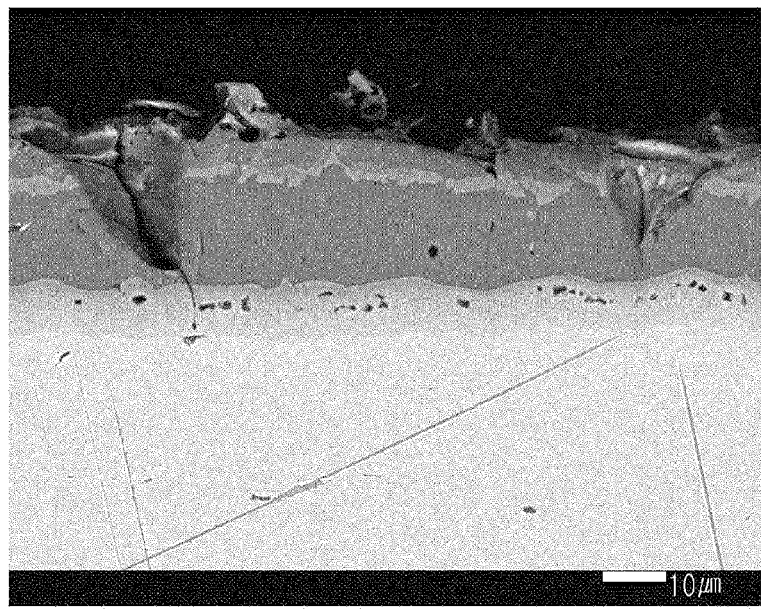
[FIG. 6]
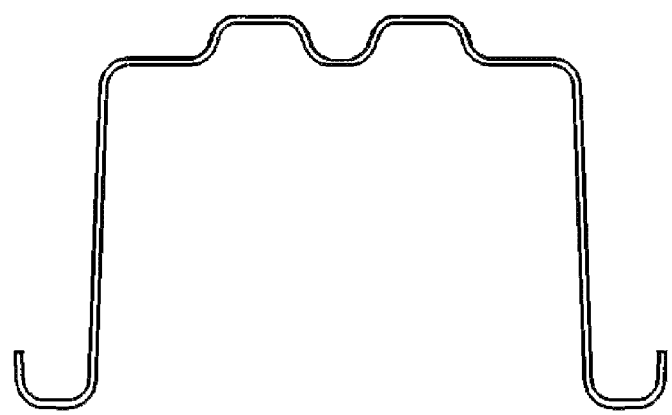

STEEL SHEET PLATED WITH AL—FE ALLOY FOR HOT PRESS FORMING HAVING EXCELLENT CORROSION RESISTANCE AND HEAT RESISTANCE, HOT PRESS FORMED PART, AND MANUFACTURING METHOD THEREFOR

CROSS-REFERENCE OF RELATED APPLICATIONS

This application is the U.S. National Phase under 35 U.S.C. § 371 of International Patent Application No. PCT/KR2019/016761, filed on Nov. 29, 2019, which in turn claims the benefit of Korean Application Nos. 10-2018-0152574, filed on Nov. 30, 2018 and 10-2019-0156856, filed on Nov. 29, 2019, the entire disclosures of which applications are incorporated by reference herein.

TECHNICAL FIELD

The present disclosure relates to a steel sheet plated with an Al—Fe alloy for hot forming having excellent corrosion resistance and heat resistance, a hot press formed part, and a manufacturing method therefor.

BACKGROUND ART

In recent years, due to depletion of petroleum energy resources and high interest in the environment, regulations on improving the fuel efficiency of automobiles have been strengthened. In terms of materials, reducing a thickness of a steel sheet used in automobiles may be a method for improving fuel efficiency of automobiles. However, the reducing a thickness of a steel sheet may cause problems in automobile safety, and thus, in this case, improvements of strength of the steel sheet should be facilitated.

Thus, there has been continuous demand for high-strength steel sheets, and various kinds of steel sheets have been developed. However, since these steel sheets have high strength in themselves, workability thereof is poor. That is, since a product of strength and elongation for each grade of steel sheet tends to always have a constant value, when strength of the steel sheet increases, there may be a problem that elongation, an index of workability, decreases.

In order to solve this problem, a hot forming method has been proposed. The hot forming method is a method forming a low temperature structure, such as martensite or the like, in a steel sheet by forming at a high temperature suitable for forming and then quenching the steel sheet at a low temperature to increase strength of a final product. In this case, there is advantage that the problem of workability may be minimized when manufacturing a member having high strength.

In the case of the aforementioned hot forming method, since the steel sheet has to be heated to a high temperature, a surface of the steel sheet is oxidized, which additionally requires a process of removing oxides on the surface of the steel sheet after press forming. In order to solve this problem, patent document 1 was proposed. In patent document 1, a steel sheet subjected to aluminum-plating is used in a process of hot forming or heating and quenching after room temperature forming (briefly, post-heat treatment). Since an aluminum-plating layer is present on the surface of the steel sheet, the steel sheet is not oxidized at the time of heating.

However, even if the aluminum-plating layer exists on the surface as in the patent document 1 and the steel sheet is not oxidized during heating, a member obtained after heating and forming may still be exposed to a corrosive environment. In particular, in the process of heating the plated steel sheet, base iron diffuses into the aluminum-plating layer to form a hard alloyed layer of Fe and Al on the surface of the steel sheet, but the alloyed layer may be fragile as a hard layer. Accordingly, there may be problems in which cracks occur in the plating layer, and a base steel sheet is exposed to a corrosive environment to deteriorate corrosion resistance.

(Patent document 1) U.S. Patent Publication No. U.S. Pat. No. 6,296,805

DISCLOSURE

Technical Problem

An aspect of the present disclosure is to provide a steel sheet plated with an Al—Fe alloy, capable of forming a hot press formed part having excellent corrosion resistance and heat resistance, a hot press formed part obtained using the same, and a method of manufacturing the same.

The technical problem of the present disclosure is not limited to the aforementioned contents. A person skilled in the art to which the present disclosure pertains will not have any difficulty in understanding the additional technical problem of the present disclosure from the general details of the present disclosure.

Technical Solution

According to an aspect of the present disclosure, a steel sheet plated with an Al—Fe alloy, includes a base steel sheet; and an alloy plating layer formed on the base steel sheet, wherein the alloy plating layer comprises an alloyed layer (I) formed on the base steel sheet and including Al: 5 to 30% by weight; an alloyed layer (II) formed on the alloyed layer (I) and including Al: 30 to 60% by weight; and an alloyed layer (III) formed on the alloyed layer (II) and including Al: 20 to 50% by weight, wherein FeAl (Si) alloy phases including Al: 20 to 50% and Si: 5 to 20%, by weight, are dispersed and distributed in the alloyed layer (II), and a number density of FeAl (Si) alloy phases having a circle-equivalent diameter of 5 μm or less is $10^3$ pieces/mm$^2$ or more.

The alloy plating layer may further include an alloyed layer (IV) formed on the alloyed layer (III) and including Al: 30 to 60% by weight.

The base steel sheet may include, by weight, C: 0.04 to 0.5%, Si: 0.01 to 2%, Mn: 0.1 to 5%, P: 0.001 to 0.05%, S: 0.0001 to 0.02%, Al: 0.001 to 1%, N: 0.001 to 0.02%, a balance of Fe, and other impurities.

The base steel sheet may further include, by weight, at least one of B: 0.001 to 0.01%, Cr: 0.01 to 1%, or Ti: 0.001 to 0.2%.

According to another aspect of the present disclosure, a hot press formed part obtained by hot press forming the above-mentioned steel sheet is provided, wherein FeAl (Si) alloy phases including Al: 20 to 50% and Si: 5 to 20%, by weight, are dispersed and distributed in the alloyed layer (II), and a number density of FeAl (Si) alloy phases having a circle-equivalent diameter of 5 μm or less is $10^4$ pieces/mm$^2$ or more.

According to another aspect of the present disclosure, a method of manufacturing a steel sheet plated with an Al—Fe alloy for hot forming, includes aluminum-plating and coiling a base steel sheet to obtain an aluminum-plated steel sheet;

annealing the aluminum-plated steel sheet to obtain an aluminum-iron alloy-plated steel sheet; and cooling the aluminum-iron alloy-plated steel sheet, wherein an amount of the aluminum-plating is 30 to 200 g/m² based on one surface of the base steel sheet, a rate of cooling to 250° C. after the aluminum-plating is 20° C./sec or less, tension in the coiling is 0.5 to 5 kg/mm², the annealing is carried out within a heating temperature range of 550 to 750° C. in a batch annealing furnace for 30 minutes to 50 hours, when heating from room temperature to the heating temperature during the annealing, an average temperature increase rate is 10 to 100° C./h, and an average temperature increase rate in a 400 to 500° C. section is 1 to 15° C./h, a difference between an atmospheric temperature in the batch annealing furnace and a steel sheet temperature is 5 to 80° C.

The base steel sheet may include, by weight, C: 0.04 to 0.5%, Si: 0.01 to 2%, Mn: 0.1 to 5%, P: 0.001 to 0.05%, S: 0.0001 to 0.02%, Al: 0.001 to 1%, N: 0.001 to 0.02%, a balance of Fe, and other impurities.

The base steel sheet may further include, by weight, at least one of B: 0.001 to 0.01%, Cr: 0.01 to 1%, or Ti: 0.001 to 0.2%.

According to another aspect of the present disclosure, a method of manufacturing a hot press formed part includes heat-treating the steel sheet according to any one of claims 1 to 5 within a temperature range of Ac3 to 950° C. for 1 to 15 minutes; and hot press forming the heat-treated steel sheet.

Advantageous Effects

According to an aspect of the present disclosure, a steel sheet plated with an Al—Fe alloy, including alloyed layers (I) to (III) or alloyed layers (I) to (IV) on a base steel sheet, and in which a plating layer, not melted even when heated for hot forming, is formed, may have an effect of excellent heat resistance.

In addition, according to an aspect of the present disclosure, a steel sheet plated with an Al—Fe alloy, in which a fine FeAl (Si) alloy phase is dispersed and distributed in the alloyed layer (II), may effectively suppress formation of cracks occurring in the alloyed layer (II), a hard layer, to have an effect of obtaining excellent corrosion resistance.

Various advantages and effects of the present disclosure are not limited to the above-described contents, and can be more easily understood in the process of describing specific embodiments of the present disclosure.

DESCRIPTION OF DRAWINGS

FIG. 1 is a photograph of a cross-section of a plating layer of a steel sheet plated with an Al—Fe alloy, manufactured according to Inventive Example 1, observed with a scanning electron microscope.

FIG. 2 is a photograph of a cross-section of a plating layer of a steel sheet plated with an Al—Fe alloy, manufactured according to Inventive Example 2 as a modified example in which an alloyed layer (IV) is formed on an alloyed layer (III), observed with a scanning electron microscope.

FIG. 3 is a photograph of a cross-section of a plating layer of a steel sheet plated with an Al—Fe alloy, manufactured according to Comparative Example 1, observed with a scanning electron microscope.

FIG. 4 is a photograph of a cross-section of a plating layer of a steel sheet plated with an Al—Fe alloy, after hot forming, manufactured according to Inventive Example 1, observed with a scanning electron microscope.

FIG. 5 is a photograph of a cross-section of a plating layer of a steel sheet plated with an Al—Fe alloy, after hot forming, manufactured according to Comparative Example 1, observed with a scanning electron microscope.

FIG. 6 is a cross-sectional view of a mold used for evaluating properties of a plating layer and corrosion resistance of a member after hot forming in Examples.

BEST MODE FOR INVENTION

Hereinafter, a steel sheet plated with an Al—Fe alloy according to an aspect of the present disclosure will be described in detail. In the present disclosure, it should be appreciated that the content of each element refers to weight percentage (wt %), unless otherwise specified. In addition, the ratio of grains or structures is based on area unless otherwise indicated.

[Steel Sheet Plated with Al—Fe Alloy]

A steel sheet plated with an Al—Fe alloy, according to an aspect of the present disclosure, may include a base steel sheet; and an alloy plating layer formed on the base steel sheet, wherein the alloy plating layer comprises an alloyed layer (I) formed on the base steel sheet and including Al: 5 to 30% by weight; an alloyed layer (II) formed on the alloyed layer (I) and including Al: 30 to 60% by weight; and an alloyed layer (III) formed on the alloyed layer (II) and including Al: 20 to 50% by weight. In addition, as a modified example of the present disclosure, an alloyed layer (IV) having the same alloy composition as that of the alloyed layer (II) may be further included on the alloyed layer (III).

According to an aspect of the present disclosure, the alloyed layer (I) may include Al: 5 to 30% by weight, the alloyed layer (II) may include Al: 40 to 60% by weight, and the alloyed layer (III) may include Al: 20 to 40% by weight.

In addition, according to an aspect of the present disclosure, the alloyed layer (I) may include Al: 5 to 30% by weight, the alloyed layer (II) may include Al: 45 to 60% by weight, and the alloyed layer (III) may include Al: 20 to 40% by weight.

When aluminum is plated on the base steel sheet and then heat treated, Fe of the base steel sheet may be diffused into the aluminum-plating layer having a high Al content. In this case, alloying between Al and Fe may be performed in the plating layer, and a layer structure consisting of the alloyed layers (I) to (III) may be formed according to a degree of alloying of Fe.

In addition, as a modified example of the present disclosure, an alloyed layer (IV) may be formed on the alloyed layer (III) according to the conditions of the alloying heat treatment. The formation of the alloyed layer (IV) may be affected by alloying behavior of Fe of the base steel sheet and Al and Si of the plating layer, and whether or not the formation is carried out may be determined, according to a temperature and a time period of a batch annealing process performed after aluminum-plating in the present disclosure. Typically, when heat treatment is performed under a heat treatment condition having a short batch annealing time period, the formation may be carried out mainly, and a configuration, an alloy composition range, or the like thereof may be substantially identical to those of the alloyed layer (II). A reason for the formation of the alloyed layer (IV) has not been accurately identified. The alloyed layer (II) and the alloyed layer (IV) may be phases with little Si solubility, and it is thought that Si present in the plating layer during alloying may move to the alloyed layer (III), an AlFe(Si) phase, and the alloyed layer (II) and the alloyed layer (IV) without Si solubility may be formed around the alloyed layer (III). In this case, when the batch annealing time period is sufficient, it is thought that the alloyed layer (III) is relatively grown in a surface direction due to a continuous alloying reaction, and the alloyed layer (IV) does not exist.

In the steel sheet plated with an Al—Fe alloy according to an aspect of the present disclosure, a fine FeAl (Si) alloy phase including Al: 20 to 50% and Si: 5 to 20%, by weight, may be dispersed and distributed in the alloyed layer (II). The FeAl (Si) alloy phase may be an Al—Fe—Si compound that may be formed in a manufacturing process of a steel sheet plated with an Al—Fe alloy of the present disclosure, and a wide variety of phases may be formed depending on the heat treatment conditions and the composition ratio of each component, and a location of formation will also be different. In addition, the FeAl (Si) alloy phase may have a soft property with low hardness, as compared to the alloyed layer (II).

In addition, according to an aspect of the present disclosure, in the FeAl (Si) alloy phase, an amount of Al may be 22 to 35%, and an amount of Si may be 5 to 16%.

In addition, the present disclosure may be characterized in that a number density of FeAl (Si) alloy phases having a circle-equivalent diameter of 5 μm or less in the alloyed layer (II) may be $10^3$ pieces/mm$^2$ or more. Preferably, a number density of FeAl (Si) alloy phases having a circle-equivalent diameter of 5 μm or less in the alloyed layer (II) may be $5\times10^3$ pieces/mm$^2$ or more, and more preferably $10^4$ pieces/mm$^2$ or more.

In this case, the equivalent circle diameter of the FeAl (Si) alloy phases refers to a diameter of a circle having the same area as a particle area when observing a cross-section perpendicular to the plating layer, and the equivalent circle diameter may be easily measured by observation with a scanning electron microscope in a cross-section perpendicular to the plating layer. In general, when heating for hot forming, the number and a fraction of FeAl (Si) alloy phases present in the alloyed layer (II) may increase due to an alloying reaction of the plating layer and a base iron, but a number density of FeAl (Si) alloy phases in the plated steel sheet before hot forming may play an important role in distribution and a number density of FeAl (Si) alloy phases formed during hot forming. In addition, in the alloyed layer (II), which may be a main component of the alloy plating layer, since hardness thereof is high, cracks may easily occur in the alloy plating layer in areas in which a shape is complex, such as a curved portion during hot forming. When the FeAl (Si) alloy phases having a relatively ductility is dispersed and distributed in a certain amount or more, cracks in the alloy plating layer may be effectively suppressed, to prevent deterioration of corrosion resistance due to cracks in the plating layer in the curved portion.

It may be important to control a number density of FeAl (Si) alloy phases in the hard alloyed layer (II) to a certain amount or more. When a number density of FeAl (Si) alloy phases having a circle-equivalent diameter of 5 μm or less is less than $10^3$ pieces/mm$^2$, an effect of suppressing cracking of the plating layer in the curved portion due to dispersion and distribution of the FeAl (Si) alloy phases may be insufficient, to deteriorate corrosion resistance in the curved portion. Therefore, in the present disclosure, a number density of FeAl (Si) alloy phases having a circle-equivalent diameter of 5 μm or less may be limited to $10^3$ pieces/mm$^2$ or more. Since it is preferred to have a higher number density of FeAl (Si) alloy phases, an upper limit thereof is not particularly limited, but as a non-limiting example, a number density of FeAl (Si) alloy phases may be $10^8$ pieces/mm$^2$ or less. This may be because when a number density of FeAl (Si) alloy phases exceeds $10^8$ pieces/mm$^2$, a fraction of a soft phase in the plating layer may increase to deteriorate scratch resistance of the plating layer.

When the alloyed layer (IV) is formed on the alloyed layer (III) according to a modified example of the present disclosure, an FeAl (Si) alloy phase may be included in the alloyed layer (IV). When the alloyed layer (IV) is formed too thin, the FeAl (Si) alloy phase may not be included, since a space in which the FeAl (Si) alloy phase is formed is insufficient.

The base steel sheet of the present disclosure, as a steel sheet for hot forming, may not be particularly limited when used in hot forming. According to one aspect of the present disclosure, the base steel sheet may include, by weight, C: 0.04 to 0.5%, Si: 0.01 to 2%, Mn: 0.1 to 5%, P: 0.001 to 0.05%, S: 0.0001 to 0.02%, Al: 0.001 to 1%, N: 0.001 to 0.02%, a balance of Fe, and other impurities. Hereinafter, each component system will be described in detail.

C: 0.04 to 0.5%

Carbon (C) may be added in an appropriate amount as an essential element to increase strength of a heat treatment member. For example, in order to ensure sufficient strength of the heat treatment member, C may be added in an amount of 0.04% or more. Preferably, a lower limit of an amount of C may be 0.1% or more. In a case that an amount of C is too high, when a cold rolled material is produced, strength of a hot rolled material is too high when cold rolling the hot rolled material, and thus, cold rolling property may be significantly deteriorated and spot weldability may be significantly lowered. Therefore, in order to ensure sufficient cold rolling property and spot weldability, carbon (C) may be added in an amount of 0.5% or less. Also, preferably, an amount of C may be 0.45% or less, and more preferably, an amount of C may be limited to be 0.4% or less.

Si: 0.01 to 2%

Silicon (Si) should be added as a deoxidizer in steel making and also serves to inhibit occurrence of carbide, which has the greatest effect on strength of a hot rolled press formed member. In the present disclosure, Si may be added in an amount of 0.01% or more to secure residual austenite by concentrating carbon at martensite lath grain boundaries after the formation of martensite in hot forming. In addition, an upper limit of an amount of Si may be set to 2%, to ensure sufficient plating properties, when performing aluminum-plating on a steel sheet after rolling. Preferably, an amount of Si may be limited to 1.5% or less.

Mn: 0.1 to 5%

Manganese (Mn) may be added in an amount of 0.1% or more to lower a critical cooling rate for securing martensite in the hot press formed member, as well as securing a solid solution strengthening effect. In addition, an amount of Mn may be limited to 5% or less, in view of the facts that workability of a hot forming process is secured, manufacturing cost is reduced, and spot weldability is improved by appropriately maintaining strength of the steel sheet.

P: 0.001 to 0.05%

Phosphorus (P) may be present as an impurity in steel and a less amount thereof may be advantageous. Therefore, in the present disclosure, an amount of P may be limited to 0.05% or less, and preferably, may be limited to 0.03% or less. Since a smaller amount of P is advantageous, there is no need to specifically set an upper limit of an amount of P. However, excessive lowering an amount of P may lead to an increase in manufacturing cost, and in consideration of this, a lower limit of an amount of P may be set to 0.001%.

S: 0.0001 to 0.02%

Since sulfur (S) may be an impurity in steel and may be an element that inhibits ductility, impact characteristics, and weldability of a member, and thus, a maximum amount of S may be limited to 0.02%, and preferably, to 0.01% or less. In addition, when a minimum amount thereof is less than 0.0001%, manufacturing cost may increase. Therefore, a lower limit of an amount of S may be set to 0.0001%.

Al: 0.001 to 1%

Aluminum (Al) may increase cleanliness of steel by deoxidizing the steel together with Si, and may be added in an amount of 0.001% or more to obtain the above effect. In addition, an amount of Al may be limited to 1% or less, to prevent an Ac3 temperature from becoming too high, such that heating required during hot forming may be performed within an appropriate temperature range.

N: 0.001 to 0.02%

Nitrogen (N) is an element included as an impurity in the steel. In order to reduce sensitivity to occurrence of cracks and secure impact characteristics during a continuous casting process of a slab, and, a lower amount thereof is more advantageous, and therefore, N may be included in an amount of 0.02% or less. Although it is not necessary to set a lower limit thereof, an amount of N may be set to 0.001% or more, in consideration of an increase in manufacturing cost.

In addition to the alloy composition described above, the steel sheet plated with an Al—Fe alloy, according to an aspect of the present disclosure, may further include, by weight, at least one of B: 0.001 to 0.01%, Cr: 0.01 to 1%, or Ti: 0.001 to 0.2%.

B: 0.001 to 0.01%

The addition of even a small amount of boron (B) may improve hardenability. In addition, B may segregate along prior-austenite grain boundaries to inhibit embrittlement of a hot press formed member due to grain boundary segregation of P and/or S. Therefore, B may be added in an amount of 0.0001% or more. When an amount of B exceeds 0.01%, the effect may be saturated and may causes brittleness during hot press rolling. Therefore, an upper limit of an amount of B may be set to 0.01%, and an amount of B may be preferably set to 0.005% or less.

Cr: 0.01 to 1%

Similarly to Mn, chromium (Cr) may be an element added to improve a solid solution strengthening effect and hardenability during hot forming, and may be added in an amount of 0.01% or more, to obtain the above effect. In order to secure weldability of a member, an amount of Cr may be limited to 1% or less. When an amount of Cr exceeds 1%, an effect of improving hardenability, relative to an amount added, may also be weak, which may be disadvantageous in terms of cost.

Ti: 0.001 to 0.2%

Titanium (Ti) may be not only effective in improving strength of a heat treated member due to formation of fine precipitates and improving the collision performance of the member due to grain refinement, but also effective in maximizing an effect of adding B by first reflecting Ti with N, when B is added. In order to obtain the above effect, Ti may be added in an amount of 0.001% or more. Formation of coarse TiN caused by an increase in amount of Ti may deteriorate collision performance of the member. Therefore, an amount of Ti may be limited to 0.2% or less.

The balance other than the aforementioned components may include iron (Fe) and inevitable impurities, and addition of a component that may be included in the steel sheet for hot press forming may not be particularly limited.

Typical aluminum-plated hot forming steel sheets may have insufficient heat resistance because a melting point of an aluminum-plating layer is lower than a heating temperature for hot forming. For this reason, it is disadvantageous that a plating layer may melt during heating for hot forming to contaminate a roll in a heating furnace, or rapid heating is impossible. A steel sheet for hot press forming, according to the present disclosure, may have an aluminum-iron alloy plating layer, and a melting point of an alloy plating layer may be about 1160° C. or higher, which may be higher than a heating temperature for hot forming. Therefore, excellent heat resistance may be exhibited.

A hot press formed part may be manufactured by heat-treating a steel sheet plated with an Al—Fe alloy, including an alloy plating layer and a base steel sheet, having the above-described alloy composition and layer structure, within a temperature range of Ac3 to 950° C. for 1 to 15 minutes and hot press forming the heat-treated steel sheet.

Specifically, another aspect of the present disclosure may be a hot press formed part obtained by hot press forming the above-described steel sheet plated with an Al—Fe alloy, and may be a hot press formed part in which FeAl (Si) alloy phases including Al: 20 to 50% and Si: 5 to 20%, by weight, are dispersed and distributed in the alloyed layer (II), and a number density of FeAl (Si) alloy phases having a circle-equivalent diameter of 5 μm or less is $10^4$ pieces/mm$^2$ or more.

A hot press formed part manufactured by hot press forming a steel sheet plated with an Al—Fe alloy, according to the present disclosure, may have an equivalent circle diameter of 5 μm or less, and soft FeAl (Si) alloy phases may be dispersed and distributed in a number density of $10^4$ pieces/mm$^2$ or more in a hard alloyed layer (II), to suppress formation of cracks in a plating layer in areas in which a shape is complex, such as a curved portion during hot forming. Therefore, corrosion resistance may be improved.

In the hot press formed part, a number density of FeAl (Si) alloy phases having a circle-equivalent diameter of 5 μm or less is preferably $2\times10^4$ pieces/mm$^2$ or more, more preferably $3\times10^4$ pieces/mm$^2$ or more.

In addition, since a number density of FeAl (Si) alloy phases in the hot press formed part is preferred to be high, an upper limit thereof may not be limited, and, as a non-limited example, may be $10^9$ pieces/mm$^2$ or less. When a number density of FeAl (Si) alloy phases in the hot press formed part exceeds $10^9$ pieces/mm$^2$, chipping resistance may be deteriorated due to a decrease in hardness of the plating layer.

In addition, although not particularly limited, according to an aspect of the present disclosure, in the FeAl (Si) alloy phases, an amount of Al may be 22 to 35%, and an amount of Si may be 5 to 16%.

Hereinafter, a method of manufacturing a steel sheet plated with an Al—Fe alloy, according to another aspect of the present disclosure, will be described in detail. However, the following method of manufacturing a steel sheet plated with an Al—Fe alloy for hot forming may be only illustrative, and it does not mean that a steel sheet plated with an Al—Fe alloy for hot press forming, according to another aspect of the present disclosure, should be manufactured by this manufacturing method. It should be appreciated that any method may be used to implement each embodiment of the present disclosure if it satisfies the claims of the disclosure.

[Method of Manufacturing Steel Sheet Plated with Al—Fe Alloy]

A steel sheet plated with an Al—Fe alloy of the present disclosure may be obtained by preparing a hot-rolled or cold-rolled base steel sheet, hot-dip aluminum-plating on a surface of the base steel sheet, and then annealing the plated steel sheet for alloying.

Aluminum-Plating Process

A base steel sheet having the above-described alloy composition may be prepared, and the base steel sheet may be aluminum-plated and coiled under appropriate conditions to obtain an aluminum-plated steel sheet (coil).

First, a surface of a rolled steel sheet may be aluminum-plated at a plating amount of 30 to 200 g/m² based on one surface. The aluminum-plating may be a type of AlSi plating (including 80% or more of Al and 5 to 20% of Si, and additional elements may be included, as necessary), usually called type I, but may be a type of plating (including 90% or more of Al, and additional elements may be included, as necessary), called type II, both may be used. In order to form a plating layer, hot-dip aluminum-plating may be performed, and an annealing treatment may be performed on the steel sheet before the plating. When the plating, a proper amount of plating may be 30 to 200 g/m² based on one surface. When the amount of plating is too large, it may take an excessive amount of time to alloy to the surface. When the amount of plating is too small, it may be difficult to obtain sufficient corrosion resistance.

Next, after the aluminum-plating, cooling may be performed at a cooling rate to 20° C./sec or less up to 250° C. A cooling rate after the aluminum-plating may affects formation of a diffusion suppressing layer between a plating layer and base iron. When a cooling rate after the aluminum-plating is too fast, a diffusion suppressing layer may not be formed uniformly, and an alloying behavior of a coil during a subsequent annealing treatment may become uneven. Therefore, a cooling rate up to 250° C. after the aluminum-plating may be 20° C./second or less.

When obtaining a coil by coiling a steel sheet after plating, coiling tension of the coil may be adjusted to 0.5 to 5 kg/mm². Depending on adjustment of the coiling tension of the coil, an alloying behavior and a surface quality of the coil may be changed during a subsequent annealing treatment.

Annealing Process

An steel sheet plated with an Al—Fe alloy may be obtained by performing annealing treatment on the aluminum-plated steel sheet under the following conditions.

The aluminum-plated steel sheet (coil) may be heated in a batch annealing furnace (BAF). When heating a steel sheet, it is desirable that a target temperature and a holding time period of the heat treatment may be within a range of 550 to 750° C. for 30 minutes to 50 minutes, based on a temperature of the steel sheet (in the present disclosure, the highest temperature at which a material reaches this temperature range may be referred to as the heating temperature). Preferably, the target temperature of the heat treatment may be within a range of 600 to 750° C., and the holding time period of the heat treatment may be 30 minutes to 10 hours.

In this case, the holding time period may be a time period until a time point of starting cooling after the coil temperature reaches the target temperature. When alloying is not sufficiently performed, the plating layer may be peeled off during roll leveling. Therefore, the heating temperature may be set to 550° C. or higher for sufficient alloying. In addition, in order to prevent excessive generation of oxides on a surface layer and to secure spot weldability, the heating temperature may be 750° C. or less. In addition, in order to sufficiently secure the plating layer and prevent a decrease in productivity, the holding time period may be set to 30 minutes to 50 hours. In some cases, a temperature of the steel sheet may have a heating pattern in which the temperature continues to rise without a cooling process until it reaches the heating temperature, and a heating pattern in which the temperature rises after maintaining a certain time period at a temperature below the target temperature may be applied thereto.

When heating the steel sheet at the above-described heating temperature, in order to ensure sufficient productivity and uniformly alloy the plating layer in the entire steel sheet (coil), an average temperature increase rate may be set to be 10 to 100° C./h, based on a temperature of the steel sheet (coil) for the entire temperature range (a range from room temperature to the heating temperature). The average temperature increase rate is more preferably 10 to 50° C./h, and most preferably 10 to 30° C./h. The average temperature increase rate may be entirely controlled within the above numerical range, but in one embodiment of the present disclosure, it may be heated by setting the average temperature increase rate in the range of 400 to 500° C. to 1 to 15° C./h when increasing a temperature, in order to prevent from causing surface stains or the like due to remaining of portion of rolling oil mixed during rolling in a temperature section in which the rolling oil is vaporized, and to secure sufficient productivity. In the increase in temperature, the average temperature increase rate in the range of 400 to 500° C. is more preferably 2 to 10° C./h.

A difference between an ambient temperature in the batch annealing furnace and a temperature of the steel sheet may be 5 to 80° C. The difference between the ambient temperature in the batch annealing furnace and the temperature of the steel sheet is more preferably 5 to 50° C., and most preferably 5 to 30° C.

Conventional heating of the batch annealing furnace may take a method of heating a steel sheet (coil) by increasing an atmosphere temperature inside an annealing furnace, rather than a method of directly heating a steel sheet (coil). In this case, a difference between the atmosphere temperature and the coil temperature may not be avoided, but in order to minimize a difference in material and plating quality by location within the steel sheet, the difference between the atmosphere temperature and the steel sheet temperature may be set to 80° C. or less, based on a point in time when a target temperature of the heat treatment is reached. Ideally, the temperature difference should be as small as possible, but it may be difficult to meet entirely the average temperature increase rate condition by slowing the temperature increase rate.

Considering this, the temperature difference may be set to 5° C. or higher. In this case, the temperature of the steel sheet refers to measurement of a temperature of a bottom portion of the charged steel sheet (coil) (the bottom portion means the lowest portion of the coil), and the ambient temperature refers to a temperature measured at a center of an inner space of a heating furnace.

Hot Press Forming Process

A hot press formed part may be manufactured by performing hot press forming on a steel sheet plated with an Al—Fe alloy for hot forming, manufactured by the above-described manufacturing method. In this case, the hot press forming may use a method conventionally used in the art, and as a non-limiting example, after heat treatment at a temperature range of Ac3 to 950° C. for 1 to 15 minutes, hot press forming may be performed.

[Mode for Invention]

Hereinafter, the present disclosure will be described more specifically by way of examples. It should be noted that the following examples are intended to illustrate the present disclosure in more detail and to not limit the scope of the present disclosure. The scope of the present disclosure may be determined by the matters described in the claims and the matters able to be reasonably deduced therefrom.

(Example)

First, a cold rolled steel sheet for hot forming, having the composition illustrated in Table 1 below, was prepared as a base steel sheet, and a surface of the steel sheet was plated with a type I plating bath having an Al-9% Si-2.5% Fe composition. During the plating, an amount of the plating was adjusted to 70 g/m² per surface, and a cooling rate to 250° C. after the aluminum-plating was cooled at 12° C./sec, and coiling tension was adjusted to 2.2 kg/mm². The plated steel sheet in this state was taken as Comparative Example 1, and a photograph of a cross-section of the plating layer of Comparative Example 1 observed with a scanning electron microscope is shown in FIG. 3. In addition, a melting point of the plating layer of Comparative Example 1 was measured to be around 660° C.

TABLE 1

| Element | C | Si | Mn | Al | P | S | N | Cr | Ti | B | Ac3 |
|---|---|---|---|---|---|---|---|---|---|---|---|
| Amount (%) | 0.22 | 0.18 | 1.17 | 0.03 | 0.008 | 0.0013 | 0.0045 | 0.17 | 0.028 | 0.0025 | 825° C. |

Then, the plated steel sheet was heated to 650° C. under the following conditions in a batch annealing furnace.
Overall average heating rate up to 650° C.: 18° C./h
Average temperature increase rate in the temperature range of 400 to 500° C.: 10° C./h
Temperature difference between atmosphere and steel sheet at heating temperature: 20° C.

After the heating, it was kept at the same temperature for 10 hours. Then, the steel sheet was air-cooled to obtain a steel sheet plated with an Al—Fe alloy for hot forming, which was referred to as Inventive Example 1. A structure of a plating layer, and a number density of FeAl (Si) alloy phases having a circle-equivalent diameter of 5 µm or less in an alloyed layer (II) were confirmed by observing a cross-section of the steel sheet with a scanning electron microscope (see FIG. 1), and were illustrated in Table 3. In addition, a melting point of the alloyed layer (II) of Inventive Example 1 was measured, and was found to have a melting point of about 1160° C.

A cold rolled steel sheet for hot forming, having the composition illustrated in Table 2 below, was prepared as abase steel sheet, and a surface of the steel sheet was plated with a type I plating bath having an Al-8% Si-1.5% Fe composition. During the plating, an amount of the plating was adjusted to 60 g/m² per surface, and a cooling rate to 250° C. after the aluminum-plating was cooled at 7.5° C./sec, and coiling tension was adjusted to 3.5 kg/mm². The plated steel sheet in this state was taken as Comparative Example 2.

TABLE 2

| Element | C | Si | Mn | Al | P | S | N | Cr | Ti | B | Ac3 |
|---|---|---|---|---|---|---|---|---|---|---|---|
| Amount (%) | 0.24 | 0.25 | 1.55 | 0.02 | 0.01 | 0.0024 | 0.009 | 0.2 | 0.04 | 0.003 | 821° C. |

Then, the plated steel sheet was heated to 670° C. under the following conditions in a batch annealing furnace.

Overall average heating rate up to 670° C.: 12° C./h
Average temperature increase rate in the temperature range of 400 to 500° C.: 5° C./h
Temperature difference between atmosphere and steel sheet at heating temperature: 15° C.

After the heating, it was kept at the same temperature for 1 hour. Then, the steel sheet was air-cooled to obtain a steel sheet plated with an Al—Fe alloy for hot forming, which was referred to as Inventive Example 2. A structure of a plating layer, and a number density of FeAl (Si) alloy phases having a circle-equivalent diameter of 5 µm or less in an alloyed layer (II) were confirmed by observing a cross-section of the steel sheet with a scanning electron microscope (see FIG. 2), and were illustrated in Table 3.

TABLE 3

| | Al (wt %) of Alloy Plating Layer | | | | |
|---|---|---|---|---|---|
| | Alloyed Layer (I) | Alloyed Layer (II) | Alloyed Layer (III) | Alloyed Layer (IV) | Number Density (pieces/mm²) |
| IE1 | 26.9 | 57.3 | 37.2 | — | 1.65 × 10⁴ |
| IE2 | 29.0 | 55.5 | 31.8 | 46.9 | 3.73 × 10⁴ |

* IE refers to Inventive Example, CE refers to Comparative Example, and Number Density refers to a number density of FeAl(Si) alloy phases having a circle-equivalent diameter of 5 µm or less in the alloyed layer (II).

In addition, structures of plating layer S were confirmed by observing a cross-section of the plated steel sheets of Comparative Examples 1 and 2 with a scanning electron microscope (see FIG. 2), amounts of Al in each plating layer were measured, and results therefrom were illustrated in Table 4 below.

TABLE 4

| | Al (wt %) | |
|---|---|---|
| | Alloyed Layer | Al Layer |
| CE1 | 56.2 | 97.6 |
| CE2 | 58.7 | 96.8 |

IE: Inventive Example,
CE: Comparative Example

As illustrated in Tables 3 and 4, in Inventive Examples 1 and 2 according to the present disclosure, alloyed layers (I), (II), and (III) were sequentially formed on the base steel sheet, as shown in FIG. 2. In Comparative Examples 1 and 2, it was confirmed that an alloyed layer made of Fe and Al was formed on the base steel sheet, and an aluminum layer containing 95% or more of Al was formed on the alloyed layer, as shown in FIG. 3.

Therefore, in the plated steel sheet corresponding to Comparative Examples 1 and 2, there was no layer corresponding to the alloyed layer (II) formed on the alloyed layer (I) of the present disclosure. Therefore, a number density of FeAl (Si) alloy phases having a circle-equivalent diameter of 5 μm or less in the alloyed layer (II) could not be measured.

In order to evaluate heat resistance of the plated steel sheets obtained according to Inventive Examples 1 and 2 and Comparative Examples 1 and 2, heat treatment was performed at a temperature of 900° C. In Inventive Examples 1 and 2, since melting points of the alloy plating layers were higher than 900° C., melting thereof did not occur. Therefore, heat resistance was excellent. In Comparative Examples 1 and 2, it was confirmed that melting points of the Al layers were lower than 900° C. and heat resistance was thus inferior.

The alloy-plated steel sheets of Inventive Examples 1 and 2 and the plated steel sheets of Comparative Examples 1 and 2 were heated at 900° C. for 6 minutes, and then hot press formed with the mold of FIG. 6, to obtain hot press formed parts.

Portions of the obtained parts were collected, cross-sections thereof were observed with a scanning electron microscope, sizes and number densities of FeAl (Si) alloy phases having a circle-equivalent diameter of 5 μm or less in the alloyed layer (II) of the parts were measured, and results therefrom were be illustrated in Table 5.

A photograph of a cross-section of a plating layer of the plated steel sheet, after hot forming, manufactured according to Inventive Example 1, observed with a scanning electron microscope, was illustrated in FIG. 4, and it was confirmed that alloyed layers (I), (II), and (III) were sequentially formed on the base steel sheet, in the hot press formed part according to Inventive Example 1.

In addition, a photograph of a cross-section of a plating layer of the plated steel sheet, after hot forming, manufactured according to Comparative Example 1, observed with a scanning electron microscope, was illustrated in FIG. 5, and three (3) alloyed layers were sequentially formed on the base steel sheet, in the hot press formed part according to Comparative Example 1.

In this case, for evaluation of corrosion resistance, weight loss per unit area was measured for the part after 26 cycles of CCT, and it was determined that the part was deteriorated, when the weight loss per unit area was 10 mg/cm² or more.

In addition, for the evaluation of heat resistance, presence or absence of melting of the alloy plating layer was observed during hot press forming, and it was determined that melting of the alloy plating layer was deteriorated.

TABLE 5

| | FeAl(Si) Alloy Phases in Alloyed Layer (II) | | | Weight | | |
|---|---|---|---|---|---|---|
| | Al (wt %) | Si (wt %) | Number Density (pieces/mm²) | Loss Per Unit Area (mg/cm²) | Corrosion Resistance | Heat Resistance |
| IE1 | 25.8 | 9.8 | 4.16 × 10⁴ | 4.47 | Good | Good |
| IE2 | 23.2 | 8.8 | 7.07 × 10⁴ | 5.89 | Good | Good |
| CE1 | 28.1 | 11.7 | 9.8 × 10³ | 12.38 | Bad | Bad |
| CE2 | 35.5 | 13.8 | 6.4 × 10³ | 15.01 | Bad | Bad |

* IE refers to Inventive Example, CE refers to Comparative Example, and Number Density refers to a number density of FeAl(Si) alloy phases having a circle-equivalent diameter of 5 μm or less in the alloyed layer (II).

As can be seen in Table 5, the hot press formed parts manufactured using the steel sheets plated with an Al—Fe alloy according to Inventive Examples 1 and 2 exhibited good corrosion resistance, but in Comparative Examples 1 and 2, it was confirmed that weight loss per unit area was 10 mg/cm² or more and corrosion resistance was deteriorated.

In addition, in Inventive Examples 1 and 2, since melting points of the alloy plating layers were higher than heating temperatures for hot press forming, it was confirmed that the alloy plating layers were not melted in the finally manufactured hot press formed parts, thereby having excellent heat resistance.

In Comparative Examples 1 and 2, since melting points of the alloy plating layers were lower than heating temperatures for hot press forming, it was confirmed that the alloy plating layers were melted during heating for hot press forming to contaminate rolls in the furnace, or rapid heating was impossible.

While embodiments of the present disclosure have been shown and described, it will be apparent to those skilled in the art that modifications and variations could be made without departing from the scope of the present disclosure. Therefore, the scope of the present disclosure is not limited to the embodiments but should be defined by the appended claims and equivalents thereof.

The invention claimed is:

1. A steel sheet plated with an Al—Fe alloy for hot forming, comprising:
    a base steel sheet; and
    an alloy plating layer formed on the base steel sheet,
    wherein the alloy plating layer comprises:
    an alloyed layer (I) formed on the base steel sheet and including Al: 5 to 30% by weight;
    an alloyed layer (II) formed on the alloyed layer (I) and including Al: 30 to 60% by weight; and
    an alloyed layer (III) formed on the alloyed layer (II) and including Al: 20 to 50% by weight,
    wherein FeAl(Si) alloy phases including Al: 20 to 50% and Si: 5 to 20%, by weight, are dispersed and distributed in the alloyed layer (II), and
    a number density of FeAl(Si) alloy phases having a circle-equivalent diameter of 5 μm or less is 10³ pieces/mm² or more.

2. The steel sheet of claim 1, wherein the alloy plating layer further comprises an alloyed layer (IV) formed on the alloyed layer (III) and including Al: 30 to 60% by weight.

3. The steel sheet of claim 1, wherein the base steel sheet comprises, by weight, C: 0.04 to 0.5%, Si: 0.01 to 2%, Mn: 0.1 to 5%, P: 0.001 to 0.05%, S: 0.0001 to 0.02%, Al: 0.001 to 1%, N: 0.001 to 0.02%, a balance of Fe, and other impurities.

4. The steel sheet of claim 3, wherein the base steel sheet further comprises, by weight, at least one of B: 0.001 to 0.01%, Cr: 0.01 to 1%, or Ti: 0.001 to 0.2%.

5. A hot press formed part obtained by hot press forming the steel sheet according to claim 1,
- wherein FeAl (Si) alloy phases including Al: 20 to 50% and Si: 5 to 20%, by weight, are dispersed and distributed in the alloyed layer (II), and
- a number density of FeAl (Si) alloy phases having a circle-equivalent diameter of 5 μm or less is $10^4$ pieces/mm$^2$ or more.

* * * * *